United States Patent [19]

Brandenstein et al.

[11] Patent Number: 4,752,280
[45] Date of Patent: Jun. 21, 1988

[54] TENSIONING DEVICE FOR DRIVE BELT

[75] Inventors: Manfred Brandenstein, Eussenhein; Roland Haas, Hofheim; Ludwig Edelmann, Sulzthal; Gerhard Herrman, Schweinfurt; Rüdiger Hans, Niederwerrn, all of Fed. Rep. of Germany

[73] Assignee: SKF GmbH, Schweinfurt, Fed. Rep. of Germany

[21] Appl. No.: 918,730

[22] Filed: Oct. 14, 1986

[30] Foreign Application Priority Data

Oct. 16, 1985 [DE] Fed. Rep. of Germany ....... 3536834

[51] Int. Cl.$^4$ ............................................. F16H 7/12
[52] U.S. Cl. .................................................. 474/138
[58] Field of Search ............... 474/133, 135, 136, 138, 474/109–111, 101

[56] References Cited

U.S. PATENT DOCUMENTS 4,539,001  9/1985  Okabe .............................. 474/138

FOREIGN PATENT DOCUMENTS 2135017  8/1984  United Kingdom ............... 474/138

Primary Examiner—Stephen J. Novosad
Assistant Examiner—Thuy M. Bui
Attorney, Agent, or Firm—Rosen, Dainow & Jacobs

[57] ABSTRACT

A tensioning arrangement for a drive belt includes a support, a tension roller rotatably mounted on one end of the support, a swivel bearing arranged on the support at a distance from the tension roller, a swivel-damping element in the form of a linear-acting frictional damper having a master piston and a slave piston arranged in and separately frictionally engaging a cylinder, a spring arranged concentrically around the cylinder and coupled to the master piston, and a spring arranged inside the cylinder and coupled to the slave piston. The displacement of the master piston in one direction is opposed by the frictional forces separately acting on both pistons, whereas the displacement of the master piston in the other direction is opposed by the frictional forces acting on only the master piston.

5 Claims, 1 Drawing Sheet

TENSIONING DEVICE FOR DRIVE BELT

FIELD OF THE INVENTION

This invention relates to a tensioning device for a drive belt of the type having a damping element for damping the swiveling of the tension roller.

BACKGROUND OF THE INVENTION

A tensioning device of the foregoing type is shown in FIG. 26 of WO No. 83/00904. This reference discloses a tension roller mounted on a support arm which is swivable against the resistive force of a spiral spring. A hydraulic rotation damper is arranged coaxial to the swivel bearing which, during pulsed forces originating in the movements of the tensioned drive belt, acts in the direction of swiveling. The reference further describes a linearly movable tensioning device with linear hydraulic damping elements and corresponding helical springs. The damping action is constant during operation, for example, of an automobile engine and leads to relatively slow adjustment of the tension force of the drive belt acting against the tension spring or to high-frequency vibration. This known tensioning device using inserted hydraulic dampers offers a satisfactory solution, but the long-term behavior of such dampers, as a result of the almost unavoidable leakage loss is extremely bad particularly for damping the swiveling action produced by vibrations. Therefore the remedy for damping the aforementioned vibrations becomes ineffective very early. Furthermore, this leads to a constantly increasing noise due to load alteration, which in the case of shock absorbers inserted at other places on the vehicle signals the necessity of replacement. Although hydraulic damping, with the damping moment progressively increasing with the speed of movement, is advantageous in the case of shock absorbers for the springs of a vehicle it need not be used in the tensioning device for a drive belt.

Another tensioning device with rotation damper and helical spring is disclosed in DE-OS No. 3225411. The damping is attained in this case by a concentrically arranged plastic sleeve. Small swiveling movements are damped in accordance with this construction by flexure of the plastic material, while large swiveling movements are damped by skin friction. The concentric arrangement inside the spring effects a very small relative movement of the frictional surfaces against each other during swiveling movements of the tensioning device as a consequence of the small diameter of the plastic sleeve. In the case of small swiveling movements, damping results from only the elastic deformation of the material prior to overcoming of the static friction. This is intended in accordance with the reference and produces essentially no damping without extra resilience due to material elasticity.

SUMMARY OF THE INVENTION

The object of the invention is to attain a constant damping characteristic over the entire lifetime of a tensioning device of the above-discussed type and in particular to improve the damping of vibrations.

This object is realized by providing a damping element in the form of a linear-acting frictional damper having a piston arranged in and frictionally engaged with a cylinder.

The piston is provided with a radially resilient frictional lining which is in sliding contact with the inner surface of the cylinder. The inner surface of the cylinder is smoothly polished, as is well-known in the art. By utilizing a suitable sliding means, i.e., lubricant, a frictional contact which remains constant over a long period of time can be obtained. Although in the case of sliding friction the fundamental problem of abrasion of the frictional surfaces must be considered, for the anticipated operating time for this device this problem can be solved by the selection of suitable dimensions and by the use of known abrasion-resistant plastic materials. The leakage problem besetting hydraulic dampers does not occur so that the damping element for the tensioning device of the invention is superior and, in particular, provides constant damping of small and rapid swiveling movements caused by vibration. The largest and therefore slowest swiveling movements of the tensioning device are countered by a damping force which is independent of the speed of the movement. A damping element of this type which is particularly simple and inexpensive to produce is a linear-acting piston-cylinder combination and, if necessary, is available in the marketplace. A suitably long cylinder with a large stroke can be used such that the internal material movements of the frictional linings can be disregarded.

It is particularly advantageous when, in accordance with a further feature of the invention, a helical spring elastically coupling the piston to the cylinder is concentrically arranged relative to the cylinder of the frictional damper. This enables the construction of a particularly slender tensioning device, which is required in view of the cramped space between the motor and the radiator of an automobile engine.

In accordance with a further feature of the invention, a second, i.e. slave, piston is arranged inside the cylinder in detachable abutting relationship with the first, i.e. master, piston. The slave piston is displaceable against the force of a second spring arranged between the end of the cylinder and the master piston. For many applications it is necessary that the tensioning device provide different damping in the respective directions of swiveling. This can be achieved in the linear frictional damper of the invention by providing a second, (i.e. slave) piston in addition to the first (i.e. master) piston inside the cylinder, the slave piston being provided with a frictional lining. One face of the slave piston disengageably abuts the master piston, which is connected to outside the cylinder by way of a piston shaft, and the other face is urged away from the opposing base of the cylinder by a second spring arranged therebetween. The second spring is strong enough to overcome the frictional force acting on the slave piston and thereby displace the slave piston away from the opposing base of the cylinder in the absence of a counteracting force being applied by the master piston. Whereas the master piston pushes the slave piston by contact with the end face during displacement in one direction, in which case the movement is resisted by the frictional linings arranged on both pistons, the master piston is able to move back in the other direction alone and free, in which case the movement back is resisted only by the frictional lining mounted on the master piston.

In accordance with a further feature of the invention, the slave piston is arranged in the cylinder with a frictional force whereby the slave piston is separated from the master piston. By modification of the frictional surface structure, the frictional surface material or the prestress of the frictional lining against the inner surface of the cylinder, the frictional force can be arbitrarily changed and the requirements satisfied.

BRIEF DESCRIPTION OF THE DRAWINGS

The preferred embodiment of the invention will be described in detail with reference to the following drawings, wherein.

DETAILED DESCRIPTION OF THE PREFERRED EMBODIMENT

Figure 1:
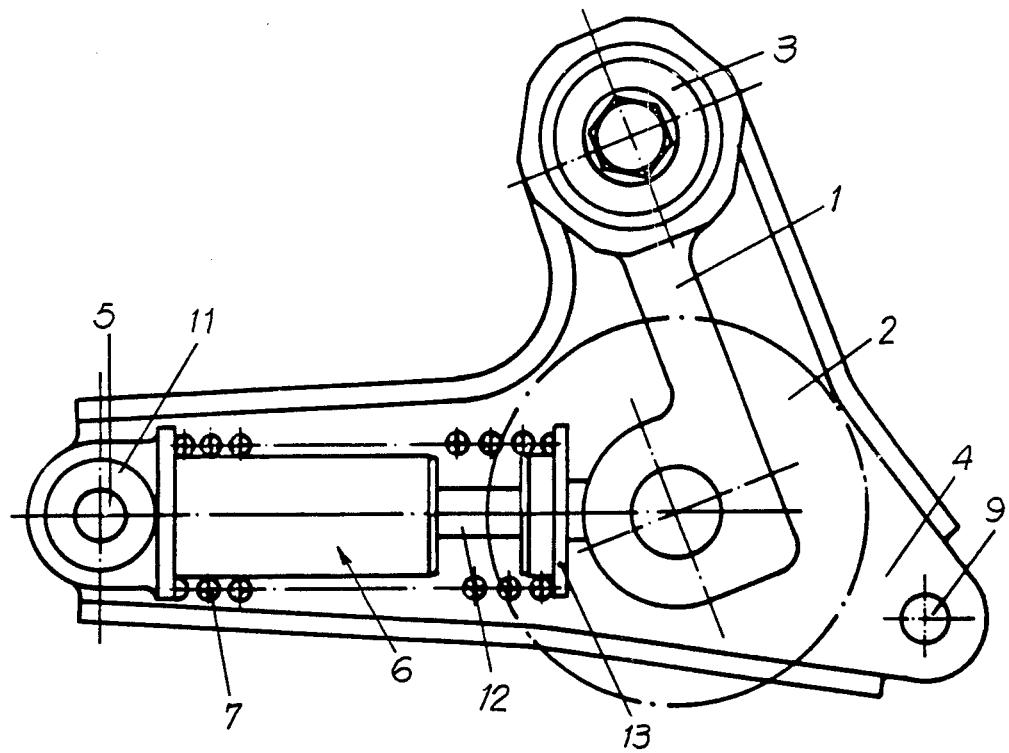
FIG. 1 is a partial top view of a tensioning device with a linear-acting damping element and a helical spring according to the invention.

The tensioning device shown in FIG. 1 comprises a support 1 and a tension roller 2 rotatably arranged thereon, which for the sake of clarity is not shown in full scale or in detail. The support 1 has a swivel bearing 3 at a distance from the axis of the tension roller, the swivel bearing being mounted on a mounting plate 4. A linear-acting frictional damper 6 with an encircling coaxially arranged helical spring 7 is mounted to extend between the mounting point (axis) of the tension roller 2 and a hinge pin 5 extending from the mounting plate 4. The axis of helical spring 7 is nearly tangential to the pivot circle (locus of movement) of the axis of the tension roller 2 around the swivel bearing 3. The helical spring 7 is a compression spring and is mounted to resiliently bias the tension roller 2 and the support 1 for displacement around the swivel bearing 3 in one of the directions of swiveling (counterclockwise in FIG. 1). By means of the helical spring 7 and the tension roller 2, a drive belt (not shown) on the tension roller can be tightened, whereby the pistons 8 and 15 of the frictional damper 6 occupy a position between their extreme movement positions. The frictional damper 6 has a damping influence on the swiveling movement of the tension roller 2. The mounting plate 4 can be securely attached to, for example, a machine block by bolts passed through the mounting bore 9 and through the swivel bearing 3.

Figure 2:
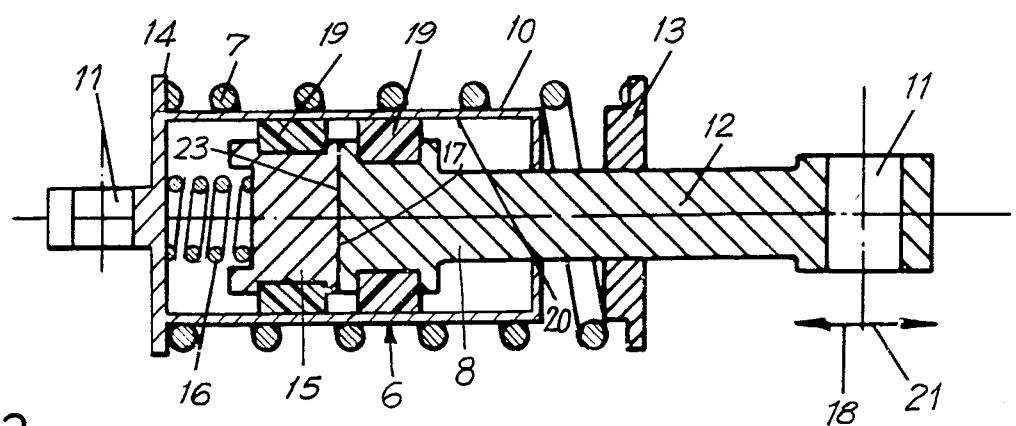
FIG. 2 is an enlarged longitudinal sectional view of the internal structure of the damping element shown in FIG. 1.

The frictional damper 6 with helical spring 7 shown in FIG. 1 is illustrated in detail in FIG. 2. The frictional damper 6 comprises a cylinder 10 with a first fastening element 11, a piston rod 12 with a master piston 8 and a second fastening element 11, a thrust disk 13 mounted on the piston rod 12, the helical spring 7 being connected at one end to the thrust disk 13 and supported at its other end by a flange 14 of the cylinder 10, and a slave piston 15 with separate spring 16. The fastening elements 11 are respectively rotatably coupled to the mounting plate 4 at the pin 5 and the support 1 at the axis of the tension roller so that frictional damper 6 is capable of rotation relative to the mounting plate and the support. The slave piston 15 and the master piston 8 detachably contact each other at their respective front end surfaces 17 and 23, so that during actuation of the frictional damper 6 in the translation direction 18, the slave piston 15 moves in the same direction in opposition to the resisting force of the separate spring 16 supported by the base of the cylinder 10. The separate spring 16 has only a small compression force and produces no significant increase in the spring resistance. Both pistons 8 and 15 are provided with a wide circumferential groove in each of which a thin elastic annular friction lining 19, for example, made of plastic material, is seated. The friction linings 19 about the inner surface 20 of the cylinder 10 under radial prestress. For this reason, both pistons 8, 15 can be moved only after overcoming the frictional force.

In FIG. 2 both pistons 8, 15 are depicted near the middle of the range of possible sliding displacement. This position corresponds approximately to the position of equilibrium of the tensioning device for a tensioned drive belt. During operation, pulsed forces and vibrations, originating in the drive belt, cause displacement of the master piston 8 from the position of equilibrium. In the translation direction 18 the master piston 8 carries the slave piston 15 with it at the same velocity, so that the frictional forces of both frictional linings 19 are effective. For translation in the direction 21 only the frictional force produced by the frictional lining 19 of the master piston 8 opposes the movement of the master piston as a consequence of the lack of a secure connection between the pistons 8 and 15. The slave piston 15 follows the master piston 8 however because of the force exerted by the separate spring 16. This is designed so that the slave piston can move to its extreme right-hand position (as viewed in FIG. 2) when the master piston 8 occupies the corresponding position in the direction 21. By means of the above-described performance, in operation, the tension roller 2 undergoes a small damping and thus a fast tension adjustment when it swivels in the direction of tensioning the drive belt, and a large damping and thus a slower yielding in the opposite direction.

Only the principle of operation of the frictional damper 6 is depicted in FIG. 2. The features necessary for assembly are apparent and hence need not be considered.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a tensioning arrangement for a drive belt having a support, a tension roller rotatably mounted on said support, a swivel bearing arranged on said support at a distance from the axis of said tension roller, a first spring arranged to bias said support in one direction about said swivel bearing, and a swivel-damping element operatively coupled to said support, the improvement wherein the damping element comprises a linear-acting frictional damper having a cylinder and a first piston arranged under radial prestress in said cylinder and in frictional engagement therewith.

2. The tensioning arrangement as defined in claim 1, wherein said first spring is a helical spring concentrically arranged relative to said cylinder and operatively coupled to said first piston.

3. The tensioning arrangement as defined in claim 2, comprising a second piston arranged in and frictionally engaged with said cylinder, and a second spring arranged inside said cylinder and operatively coupled to said second piston, said first and second pistons being in disengeagably abutting relationship.

4. The tensioning arrangement as defined in claim 3, whereas said first and second pistons separately frictionally engage said cylinder.

5. The tensioning arrangement as defined in claim 1, wherein said first piston comprises a radially resilient lining which is in sliding contact with an inner bore surface of said cylinder.

* * * * *